(12) United States Patent
Simison et al.

(10) Patent No.: US 7,499,942 B2
(45) Date of Patent: Mar. 3, 2009

(54) MODELING RECURRING EVENTS IN A DATA STORE

(75) Inventors: Christopher Michael Simison, Redmond, WA (US); Remi Alain Lemarchand, Redmond, WA (US); Robert C. Combs, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 335 days.

(21) Appl. No.: 11/319,905

(22) Filed: Dec. 28, 2005

(65) Prior Publication Data
US 2007/0150503 A1 Jun. 28, 2007

(51) Int. Cl.
G06F 17/30 (2006.01)
(52) U.S. Cl. ...................................... 707/102
(58) Field of Classification Search ............... 707/2, 707/10, 102; 345/751
See application file for complete search history.

(56) References Cited

U.S. PATENT DOCUMENTS

| | | | | |
|---|---|---|---|---|
| 6,088,026 | A | 7/2000 | Williams | 345/302 |
| 6,236,982 | B1 | 5/2001 | Mahajan et al. | 706/45 |
| 6,662,176 | B2 | 12/2003 | Brunet et al. | 707/2 |
| 6,930,620 | B2 | 8/2005 | Evans | 341/61 |
| 2002/0049792 | A1 * | 4/2002 | Wilcox et al. | 707/522 |
| 2003/0110171 | A1 * | 6/2003 | Ozer et al. | 707/10 |
| 2004/0111307 | A1 | 6/2004 | Demsky | 705/8 |
| 2004/0141005 | A1 * | 7/2004 | Banatwala et al. | 345/751 |
| 2005/0235356 | A1 | 10/2005 | Wang | 726/22 |

OTHER PUBLICATIONS

Microsoft Computer Dictionary, Fifth Edition, 2002.*
"Introduction to the TimeSeries DataBlade-Swinging Away at Date-Stamped Data", Oct. 27, 2005, http://222-128.ibm.com/developerworks/db2/library/techarticle/dm-0510durity2/ 7 pages.
Enhanced Web & Telecommunications 2005 Services Platform, Version 4.301, Earnware Corporation 2002-2005, http://www.earnware.com/pdf/2005_Services_Platform_101205.pdf, 29 pages.
Verma, K. et al., "Efficient Calendar Based Temporal Association Rule", *Sigmod Record*, Sep. 2005, 34 (3), 63-70.
Sun Java System Communications Services 6 2005Q4 Deployment Planning Guide, Sun Microsystems, Inc., Oct. 2005, http://docs.pdf.sun.com/819-2660/819-2660.pdf, 350 pages.

* cited by examiner

*Primary Examiner*—Etienne P LeRoux
(74) *Attorney, Agent, or Firm*—Woodcock Washburn LLP

(57) ABSTRACT

Time-related properties may be modeled independent of a base object. Rather than storing time properties with the object, they may be stored independently. A given object may be stored once, even if it has a recurrent time property. The description of a "meeting," for example, may be stored once. Each occurrence of that object over time may be stored in a "timeslot" (object <foo> occurs at time 't' on day 'd'). If it is a recurring property, recurrence information may be stored independently. "Exception" information may be stored independently as well.

18 Claims, 3 Drawing Sheets

MODELING RECURRING EVENTS IN A DATA STORE

BACKGROUND

In a data storage system, many of the objects stored may be related to time. Examples of data storage systems include message data storage systems, such as Microsoft Exchange, for example, databases, such as SQL Server, for example, and the like. Events such as meetings, appointments, and tasks, for example, have a very clear time relationship. Even less obvious events, such as movies, baseball games, and the Tour de France, for example, can have time relationships. An object such as a message may have several time relationships (e.g., time sent, time received, time forwarded, time read, etc.). Modeling simple time relationships, such as time sent, for example, may be simple. All that may be needed is to add a property of type "time" to the object.

The problem, however, gets much more complicated when the relationship between the object and time is not 1-to-1 (a single time at which a meeting occurs, or a single time at which a message was received) but rather 1-to-many. Examples of such relationships are "recurring" events, such as a meeting that repeats every week, or a task that must be performed quarterly. It is not beyond the realm of possibility that eventually a message store may even need to track all the different times a message was read (for example, for regulatory reasons).

In the past, the solution has been to model time-based relationships for each object type separately. Such a solution, however, makes the task of providing a unified view of time-related objects (such as a calendar of not only meetings but also other objects) very difficult to implement, support, and extend. For example, it is common for a meeting to repeat every week, except on holidays. If each time-based relationship were modeled separately, then an "exception" would need to be added to each, and added consistently with the same rules (what holidays exist? On what day do they fall? etc.). To resolve these issues, it would be desirable to have a unified scheme to model recurring time relationships regardless of the underlying object (e.g., message, meeting, appointment, etc.).

In known systems, there may be grammar for recurrence, but no grammar for exceptions. An example of an exception might be "the $28^{th}$ occurrence of this meeting, which usually falls on Monday, should fall on Tuesday." A typical calendaring program, however, may fail to detect that the Tuesday on which the $28^{th}$ occurrence of the meeting is to be held is a holiday. Typically, such a system is implemented via an object (e.g., calendar entry) with annotations that describe the recurrence requirements and the exceptions. However, there is typically no way for the end-user to see the exceptions.

SUMMARY

As disclosed herein, time-related properties may be modeled independent of a base object. Rather than storing time properties with the object, they may be stored independently. A given object may be stored once, even if it has a recurrent time property. The description of a "meeting," for example, may be stored once. Each occurrence of that object over time may be stored in a "timeslot" (e.g., object <foo>occurs at time 't' on day 'd'). If it is a recurring property, recurrence information may be stored independently. "Exception" information may be stored independently as well.

Thus, a methodology is disclosed for consistent representation of recurrence patterns and exceptions on any object. An object-independent model may be developed for representing recurring, time-based properties with exceptions. A process for developing such an object model, and a computing system having such an object model developed on it are also disclosed.

DETAILED DESCRIPTION

Figure 1:
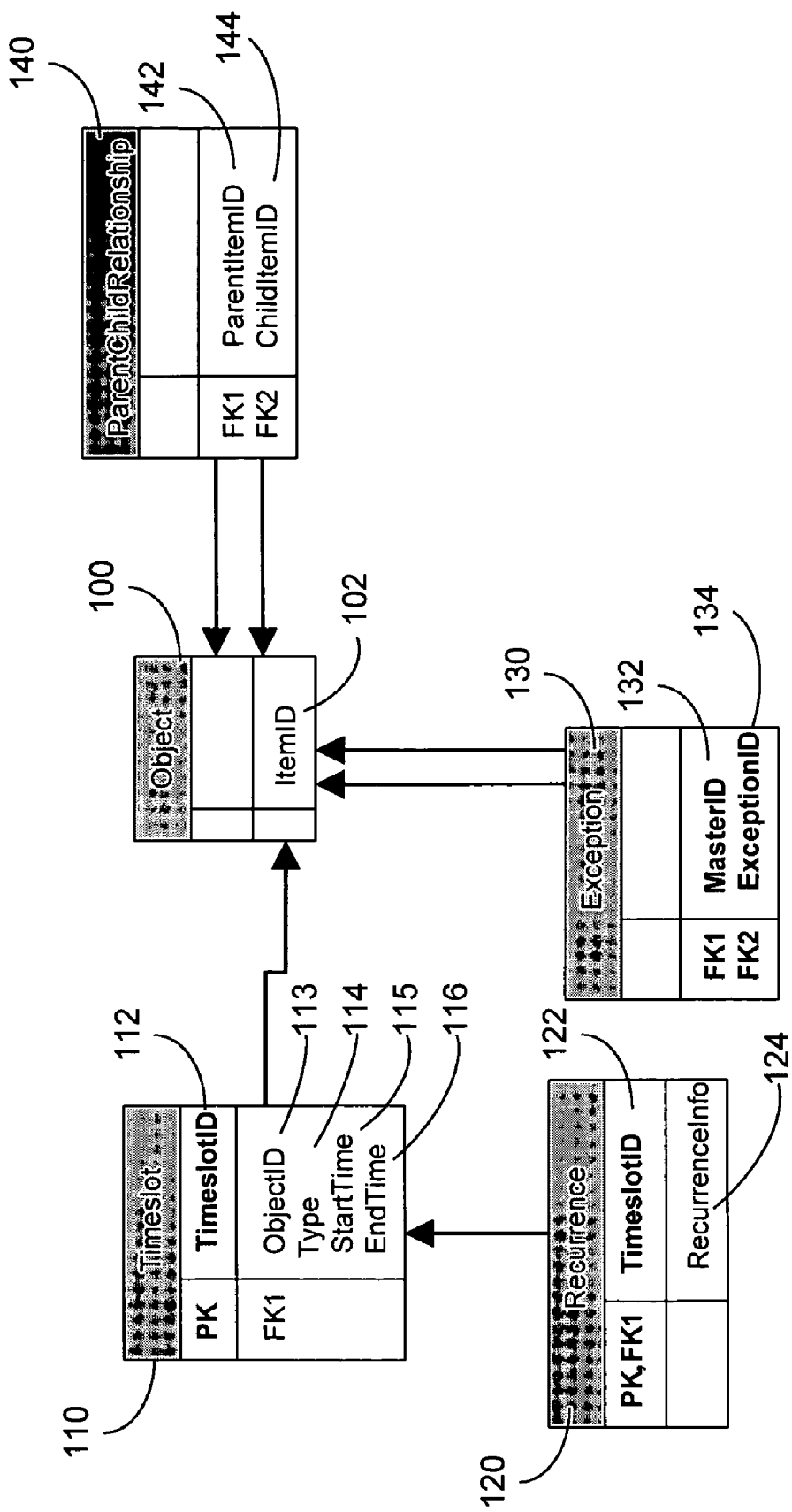
FIG. 1 is a block diagram depicting example object relationships for modeling recurring events in a message store.

FIG. 1 is a block diagram depicting example object relationships for modeling recurring events in a message store. As shown, a task, meeting, or other item may be represented by an object 100. The object 100 may have an ItemID 102, which is a unique identifier associated with the object 100. Time and scope information may exist in a Timeslot table 110. A timeslot 110 may be defined by a TimeSlot ID 112, an Object ID 113, an item Type 114, and related event scope information such as a start time 115 and an end time 116. A Recurrence may be defined in a Recurrence table 120 by a Timeslot ID 122 and any recurrence information 124. An Exception 130 may be an additional Item entry 100 that is linked by an Exception table 130 using a MasterID 132 and an ExceptionID 134.

If sub-items are allowed, such as sub-tasks, then a Parent-Child Relationship table 140 may link them together. The table 140 links the parent object 142 to one or more child objects 144. "pk" is a typical shorthand for "primary key," which is a unique identifier for an object in a data store. "fk" is a typical shorthand for "foreign key," which is a reference to a unique identifier in the data store.

Using this model, an application can quickly build a unified calendar, or similar time-relationship application, using timeslot and object—the time, object, and relationship are recorded. The recurrence and exception information are more "rationale"—why timeslot contains the data it does—and so that any changes to the object or relationship can be made with full knowledge of the reasons behind the relationships that were created. For example, if a meeting is rescheduled from every Thursday to every Monday, it is possible that exceptions may be added (for example, an occurrence of the meeting may now fall on Labor Day), or removed (it now avoids Thanksgiving Day).

Thus, such a model may include three concepts that are independent of the object itself: a time slot, which may be defined by a start time and end time pair, a recurrence pattern, which indicates how often the item is to occur, and an exception relationship, which identifies two discrete objects that are identical except for the exception. Consequently, an object does not have to know anything about time, recurrence, or exceptions. Any object could be turned into a recurring object without changing the object itself.

Figure 2:
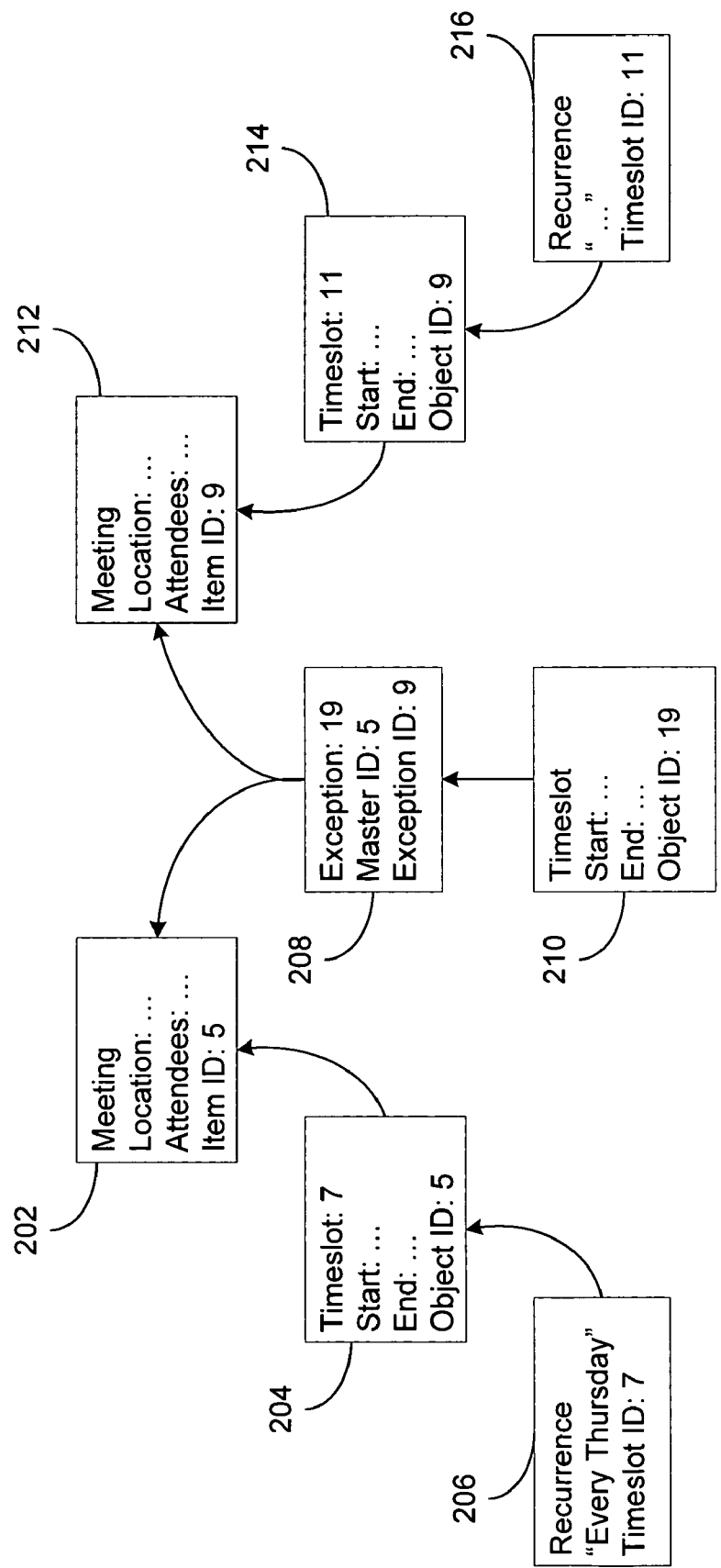
FIG. 2 is a block diagram providing an example scenario wherein recurring events in a message store are modeled.

FIG. 2 is a block diagram providing an example of modeling recurring events in a message store. As shown, a meeting object 202 may be created to indicate that a meeting is to be held at a particular location, and that certain attendees are to be invited. The object 202 may be assigned a unique ItemID (e.g., 5). A timeslot table 204 may be created to indicate the start and end times for the meeting. To tie the timeslot to the meeting defined by the object 202, the timeslot table may refer to the ItemID of the object 202 (e.g., 5). The timeslot table 204 may also have a unique TimeslotID (e.g., 7) assigned to it. At this point (i.e., without recurrence or exceptions), a calendar entry for each attendee could be entered once, for a meeting, at the location, beginning at the start time, and ending at the end time.

Suppose now that the meeting is to recur every Thursday, at the location, beginning at the start time, and ending at the end time. A Recurrence table 206 can be created with recurrence information that indicates that the meeting is to recur accordingly. The Recurrence table 206 may refer to the Timeslot ID of the Timeslot table 204. At this point (i.e., without exceptions), a calendar entry for each attendee could be entered for a meeting, at the location, beginning at the start time, and ending at the end time, every Thursday.

Suppose now that an exception to the recurrence exists on a holiday that falls on a Thursday. An Exception table 208 can be created to indicate that an exception to the recurring condition exists. The Exception table 208 may include an Exception table ID (e.g., 19) that uniquely identifies the Exception table 208, a Master ID (e.g., 5) that identifies the object to which the exception is taken (e.g., meeting every Thursday), and an Exception ID (e.g., 9) that identifies the object with which the object associated with the Master ID has an exception relationship.

A Timeslot object 210 can be created to identify, by start and end time, the time slot during which the excepted meeting would have occurred, but for the exception. The Timeslot object 210 may refer to the ObjectID of the exception 208.

An excepted meeting object 212 may be created to define the excepted meeting. The meeting object 212 may have a unique Item ID (e.g., 9). The meeting object 212 may be identical to the meeting object 202, or it may differ. For example, the excepted meeting 212 may be held at the same location, and include the same attendees, as the usual recurring meeting 202. On the other hand, the excepted meeting might occur at a different location and/or include different attendees.

A Timeslot object 214 can be created to identify, by start and end time, the time slot during which the excepted meeting is to occur. The Timeslot object 214 may refer to the ObjectID (e.g., 9) of the excepted meeting object 212. The start and end times defined by the Timeslot object 214 may be the same as the start and end times defined by the Timeslot object 204 (if, for example, meetings held on holidays are held at the same time, but in a different location (e.g., in a local bar rather than in a company conference room)). On the other hand, the start and end times might differ from those defined by the Timeslot object 204 (if, for example, the excepted meeting is to be rescheduled to the preceding Wednesday).

If the exception itself is recurrent (e.g., meetings are typically held on Mondays are held on Tuesdays in the summer months; the CEO is an attendee only during the first quarter; meetings that are typically held in a small, shabby conference room are held in the Board room during the first quarter because the CEO is an attendee), a Recurrence object 216 can be set up to cause the exception to recur accordingly. The Recurrence object 216 may refer to the timeslot object 214 that defines when the excepted meeting is to occur.

Example Computing Environment

Figure 3:
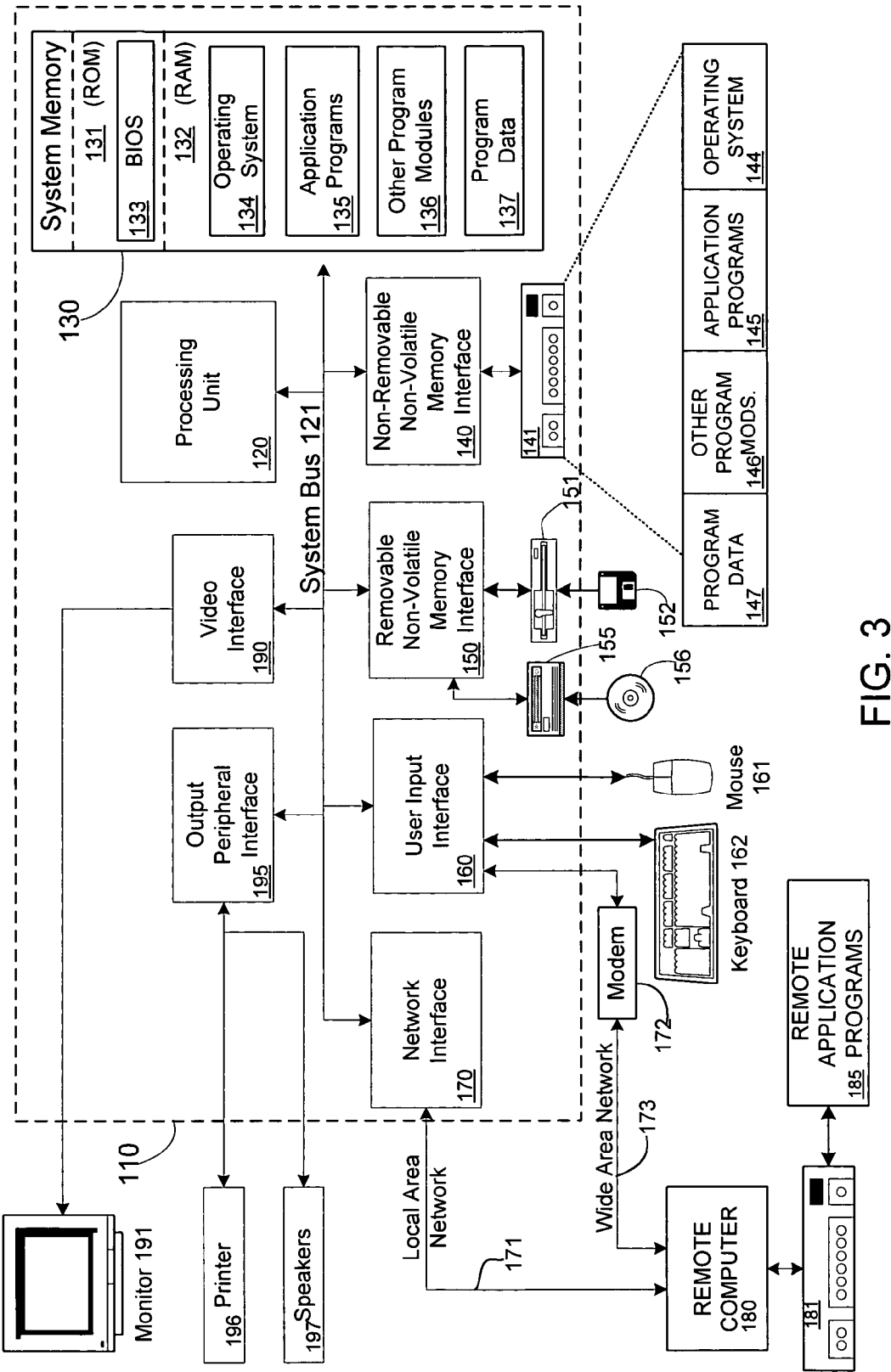
FIG. 3 is a block diagram showing an example computing environment in which aspects of the invention may be implemented.

FIG. 3 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 3 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 3, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 3 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3 provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120a-f through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3. The logical connections depicted in FIG. 3 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

What is claimed:

1. A method for modeling recurring events in a data store, the method comprising:
   creating in a data store a first object associated with a time-related item;
   creating in the data store a first timeslot object that indicates a start time and an end time associated with the time-related item;
   creating in the data store a recurrence object that indicates that the time-related item is associated with a recurring event, wherein the first object, first timeslot object, and recurrence object are each stored independent of one another in the data store as an object-independent model of the recurring event; and
   creating in the data store an exception object that indicates that an exception exists to the recurrence of the event.

2. The method of claim 1, further comprising:
   assigning to the first object a unique item identifier; and
   including in the timeslot object a reference to the item identifier.

3. The method of claim 1, further comprising:
   assigning to the timeslot object a unique timeslot identifier; and
   including in the recurrence object a reference to the timeslot identifier.

4. The method of claim 1, further comprising:
   creating in the data store a second object that is associated with the exception.

5. The method of claim 4, further comprising:
   including in the exception object respective unique identifiers associated with each of the first and second objects.

6. The method of claim 4, further comprising:
   creating in the data store a second timeslot object that indicates a start time and an end time associated with the second object.

7. The method of claim 1, wherein the item is a meeting.

8. The method of claim 1, wherein the item is a task.

9. The method of claim 1, wherein the item is a message.

10. A computer-readable storage medium, comprising:
    a data store;
    a first object stored in the data store, the first object being associated with a time-related item;
    a first timeslot object stored in the data store, wherein the first timeslot object indicates a start time and an end time associated with the time-related item;
    a recurrence object stored in the data store, wherein the recurrence object indicates that the time-related item is associated with a recurring event, wherein the first object, first timeslot object, and recurrence object are each stored independent of one another in the data store as an object-independent model of the recurring event; and
    an exception object stored in the data store, wherein the exception object indicates that an exception exists to the recurrence of the event.

11. The computer-readable storage medium of claim 10, wherein the timeslot object includes a reference to a unique item identifier associated with the first object, and the recurrence object includes a reference to a unique timeslot identifier associated with the timeslot object.

12. The computer-readable storage medium of claim 10, further comprising:
    a second object stored in the message store, wherein the second object is associated with the exception.

13. The computer-readable storage medium of claim 12, wherein the exception object includes respective unique identifiers associated with the first and second objects.

14. The computer-readable storage medium of claim 12, further comprising:
    a parent-child relationship table that links a parent object that is identified by one or more primary key fields, to at least one child object that is identified by one or more foreign key fields.

15. A method for calendaring a recurring event in a data store, the method comprising:
    creating a first calendar entry for a first occurrence of an event in accordance with a first object in the data store that defines the event;
    creating a second calendar entry for a second occurrence of the event in accordance with a recurrence object in the data store tat defines a recurrence condition; and
    creating a third calendar entry for the third occurrence of the event in accordance with an exception object in the data store that defines an exception condition, wherein the first object, recurrence object, and exception object are each stored independent of one another in the data store as an object-independent model of the recurring event.

16. The method of claim 15, wherein the recurrence object is associated with the first object through a parent-child relationship table.

17. The method of claim 16, wherein the exception object is associated with the first object through a parent-child relationship table.

18. The method of claim 15, further comprising:
    determining a start time and an end time for the first occurrence of the event from a timeslot object associated with the first object;
    determining an occurrence of the exception condition from a timeslot object associated with the exception; and
    determining a start time and an end time for the third occurrence of the event from a timeslot object associated with a second object that is associated wit the exception, wherein the first object, recurrence object, exception object, second object, timeslot object associated with the first object, timeslot object associated with the exception, and timeslot object associated with the second object are each stored independent of one another in the data store.

* * * * *

UNITED STATES PATENT AND TRADEMARK OFFICE
CERTIFICATE OF CORRECTION

| | | |
|---|---|---|
| PATENT NO. | : 7,499,942 B2 | Page 1 of 1 |
| APPLICATION NO. | : 11/319905 | |
| DATED | : March 3, 2009 | |
| INVENTOR(S) | : Christopher Michael Simison et al. | |

It is certified that error appears in the above-identified patent and that said Letters Patent is hereby corrected as shown below:

In column 8, line 26, in Claim 15, delete "tat" and insert -- that --, therefor.

In column 8, line 48, in Claim 18, delete "wit" and insert -- with --, therefor.

Signed and Sealed this

Third Day of May, 2011

David J. Kappos
*Director of the United States Patent and Trademark Office*